United States Patent
Tsuchinaga et al.

(10) Patent No.: US 6,477,131 B1
(45) Date of Patent: Nov. 5, 2002

(54) HEAD AMPLIFIER AND AN OPTICAL DISK DEVICE USING THE SAME

(75) Inventors: Hiroyuki Tsuchinaga, Kodaira (JP); Hiroyuki Minemura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/461,407

(22) Filed: Dec. 15, 1999

(30) Foreign Application Priority Data

Dec. 16, 1998 (JP) .......................................... 10-357252

(51) Int. Cl.$^7$ ................................................. G11B 7/00
(52) U.S. Cl. ................................................. 369/124.12
(58) Field of Search .......................... 369/44.35, 44.36, 369/44.41, 124.1, 124.11, 124.12, 53.31, 53.35, 44.29

(56) References Cited

U.S. PATENT DOCUMENTS 4,967,404 A * 10/1990 Orlicki et al. ............ 369/44.11
5,105,409 A * 4/1992 Kaku et al. ............... 369/44.35

FOREIGN PATENT DOCUMENTS

| EP | 0 607 445 A1 | * | 7/1994 |
| JP | 61-170938 A | * | 8/1996 |
| JP | 10-255301 A | * | 9/1998 |

* cited by examiner

*Primary Examiner*—Thang V. Tran
(74) *Attorney, Agent, or Firm*—Antonelli, Terry, Stout & Kraus, LLP

(57) ABSTRACT

An optical disk device including a head amplifier for recording/reproducing a signal onto/from a disk. In DVD-RAM disks, the signal level differs depending on whether the section is the PID area or the data field. The highest level in the PID area is a mirror level, whereas the highest level in the data field is a land/groove level. The gain of the head amplifier is limited so that the mirror level will not exceed the dynamic range of the head amplifier. Therefore, the head amplifier needs to assure a sufficient signal quality and send such a signal to a subsequent processing circuit. The signal is amplified with different suitable gains respectively for the PID area and the data field. Or an offset voltage corresponding to a difference between the mirror level and the land/groove level is applied to the PID area. As a result, the gain for the signal of the data field can be increased.

3 Claims, 10 Drawing Sheets

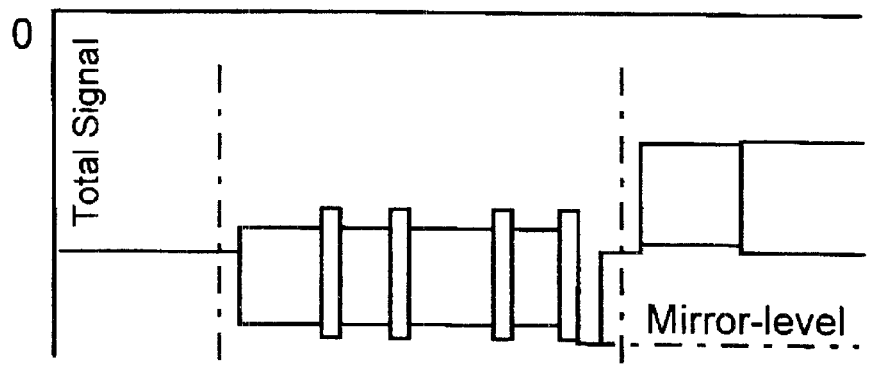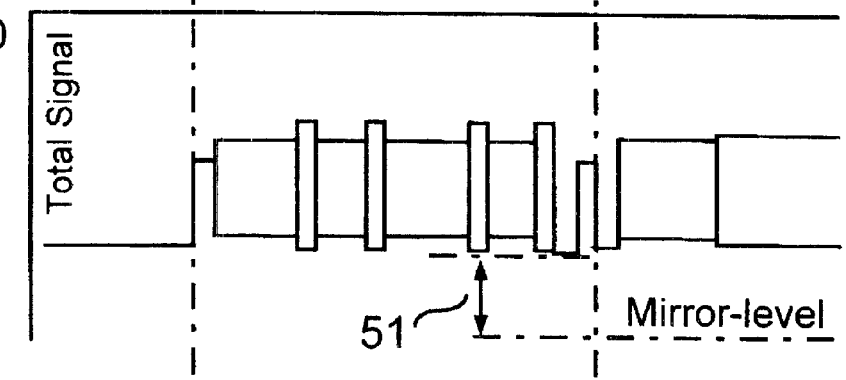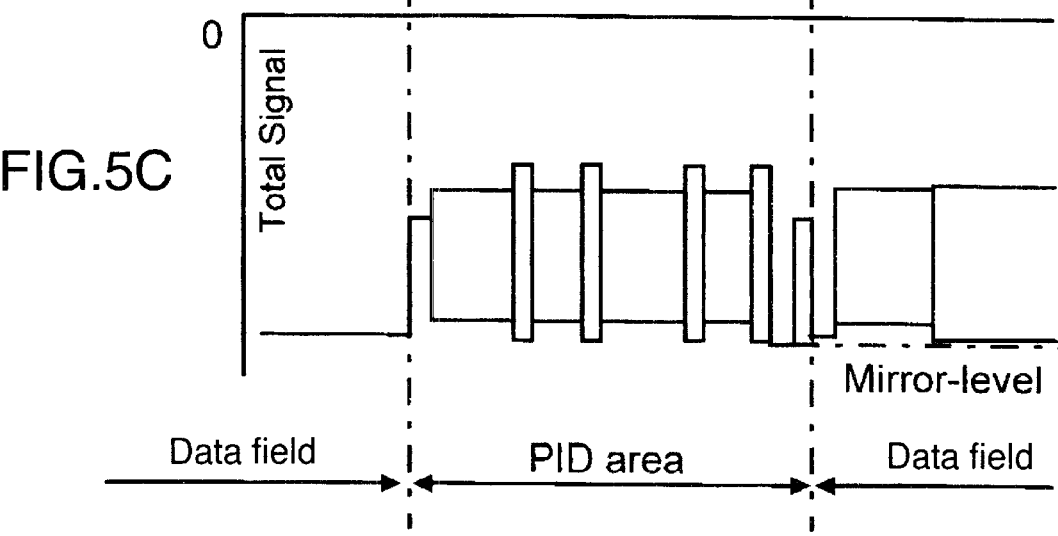

$$V_{out} = \begin{cases} V_{ref} - R_{f1} \cdot I_p \text{ (without offset addition)} \\ V_{ref} - R_{f2} \cdot I_p \text{ (with offset addition)} \end{cases}$$

Vout=Vref−Rf·Ip

HEAD AMPLIFIER AND AN OPTICAL DISK DEVICE USING THE SAME

BACKGROUND OF THE INVENTION

The present invention relates to an optical disk device for supporting a DVD-RAM disk. In particular, the present invention relates to a current-to-voltage conversion amplifier in an optical head, for converting a converted current fed from a detection photodiode to a voltage. Especially, the present invention relates to a concrete configuration of an amplifier which makes efficient use of the dynamic range of the amplifier and which is suitable for transmitting a reproduced signal to a signal processing circuit of a subsequent stage with a high signal-to-noise ratio.

The configuration of a head amplifier for reproducing a signal fed from a DVD-RAM disk is shown in FIG. 8A. A photodetector 80 functions also to detect a tracking error signal of a DVD-ROM disk. The photodetector 80 is divided into four sections. Each of photodetectors A, B, C and D is formed of a photodiode. Each photodetector converts incident light into a current. Each photodetector is connected to a current-to-voltage conversion amplifier 81. Its converted current is converted to a voltage. The resultant voltage is inputted to a summing amplifier 82. Thus, a reproduced signal corresponding to total incident light is obtained as a voltage signal.

The case where the current-to-voltage conversion amplifier 81 is formed by using an operational amplifier will now be described by referring to FIG. 8B. For the purpose of increasing the speed of light-to-current conversion, a reverse bias voltage (+Vcc) is applied to a cathode of a photodiode 83. An anode of the photodiode 83 is connected to an inverting input (−) of an operational amplifier 84. If there is no quantity of light incident on the photodiode 83, then no converted current flows, and an output voltage Vout of the operational amplifier 84 becomes equal to a reference voltage Vref applied to a non-inverting input (+) of the operational amplifier 84. In other words, Vref corresponds to zero incident light quantity. If reflected light from the disk is incident on the photodiode 83, then a converted current Ip flows out from the cathode of the photodiode 83. Since the inverting input (−) has very high input impedance, all of the current Ip flows through a gain resistor Rf. At this time, a voltage lower than the reference voltage Vref by Ip×Rf is obtained at an output terminal of the operational amplifier 84.

A track format of a DVD-RAM disk will now be described by referring to FIG. 9.

On a disk plate which is not illustrated, a groove having a wide width is formed in a spiral form.

There are two kinds of tracks called groove and land. Each track is further divided into units called sectors. The sectors are a groove sector 90 and a land sector 91. At the head of each sector, pre-pits 92 indicating address information are provided. The pre-formatted pits 92 are called PID (Physical IDentification) or Header field. In the DVD-RAM, the pre-formatted pits 92 are composed of four headers H1, H2, H3 and H4. As illustrated, two front headers H1 and H2 and two back headers H3 and H4 are disposed so as to be complementarily offset by half a track.

FIG. 10 conceptually shows an envelope of a reproduced signal obtained from a DVD-RAM disk having a capacity of, for example, 2.6 GB per single side, on the basis of an observation result. An arbitrary track of FIG. 9 is scanned with an optical spot. An optical spot position at that time is represented by the abscissa. A voltage level of a reproduced signal observed at this time is represented by the ordinate. A signal of a PID area 1000 becomes as shown in FIG. 10 because the quantity of light incident on the photodetector is lowered by a diffraction phenomenon of light at the pre-formatted pits. In a mirror section, the level of light incident on the photodetector becomes the highest because diffraction is not present. Hereafter, this level is referred to as mirror level. In a track composed of a groove and a track, the quantity of reflected light becomes lower than that of the mirror section 1001 as a result of diffraction of light performed by the groove. A signal level 1002 of a sector having no data recorded thereon corresponds to this. Hereafter, this signal level is referred to as land/groove level.

In order to describe a signal level on a recorded sector, a phase change medium used in DVD-RAMs will now be described briefly.

On the phase change medium, information is recorded by utilizing a phase transition phenomenon between two phases, i.e., a crystal phase and an amorphous phase. By converting a difference in refractive index between the crystal state and the amorphous state into a change in quantity of reflected light, recorded information is reproduced. In DVD-RAMs, there is employed such a material which is in a crystal state having a high reflection factor when no information is recorded, and which assumes an amorphous state having a lowered reflection factor when information is recorded. As shown in FIG. 10, therefore, a reproduced signal 1003 of a recorded sector has an amplitude in the darkness direction from the land/groove level.

On the other hand, an optical disk device using a magneto-optical (MO) medium has such a format that a data field recorded by magnetic marks follows a PID area composed of pre-formatted pits, in the same way as the DVD-RAM. While a pre-formatted pit signal is obtained as a change in light quantity caused by diffraction, however, a data signal is detected by converting rotation of the polarization plane of light caused by a recorded magnetic domain into a light quantity change. In a head amplifier of the magneto-optical disk device, therefore, the PID area signal and the data signal are obtained by using two different amplifiers. Furthermore, since the light quantity change caused by the recorded magnetic domain is slight, the gain of an amplifier circuit for the data field signal is typically set so as to be larger than that of an amplifier circuit for the PID area. Furthermore, since signals fed from different amplifier circuits are used, cross-talk caused mutually between signals must be removed. For that purpose, signals fed from two amplifier circuits are switched by a switch circuit according to whether the section is the PID area or the data field. A resultant single signal is subject to postprocessing. As a conventional technique of such a kind, JP-A-61-170938 can be mentioned.

SUMMARY OF THE INVENTION

The head amplifier is an amplifier for amplifying a detected signal obtained after light-current conversion. Thus the head amplifier has a role of assuring a sufficient signal quality and sending a resultant signal to a processing circuit of a subsequent stage. Therefore, the head amplifier needs to obtain a sufficiently large signal amplitude here. In other words, the head amplifier needs to have a large gain. In the DVD-RAM, however, the signal is obtained by performing the light-current conversion on light fed from the same photodetector, for both the PID area and the data field. In other words, there is a single amplifier circuit for converting a converted current to a voltage. As for a reproduced signal obtained from the single amplifier circuit, its signal level differs depending on whether the section is the PID area or the data field. The highest level in the PID area is the mirror level, whereas the highest level in the data field is the land/groove level. In the above described conventional technique of the magneto-optical (MO) disk device, therefore, the case where the reproduced signals of both the PID area and the data field can be obtained from a single detection system is not considered. The gain of the data field and the gain of the PID area cannot be set separately. As for the maximum gain of the data field, the gain of the head amplifier is limited so that the mirror level will not exceed the dynamic range of the head amplifier.

An object of the present invention is to provide a head amplifier capable of providing a detected output having such a signal amplitude as to make the signal-to-noise ratio of the data field compare favorably with that of the PID area.

Another object of the present invention is to provide an optical disk device having the above described head amplifier and having a reduced number of components.

The above described problem is caused by a premise that the signal is amplified with the same gain both for the PID area and the data field. Therefore, the above described problem is solved by amplifying the signal with different suitable gains respectively for the PID area and the data field.

Furthermore, when viewed from a different view, the above described problem is solved by adding an offset voltage corresponding to a difference between the mirror level and the land/groove level to the PID area, and increasing the gain by a quantity corresponding to the ratio of the mirror level to the land/groove level.

Other objects, features and advantages of the present invention will become apparent from the description of the embodiments of the invention taken in conjunction with the accompanying drawing.

BRIEF DESCRIPTION OF THE DRAWING

FIGS. 5A, 5B and 5C are diagrams showing envelopes of reproduced signal in a third embodiment of the present invention;

DESCRIPTION OF THE EMBODIMENTS

Embodiments of the present invention will be described by referring to accompanying drawing.

Figure 2A:
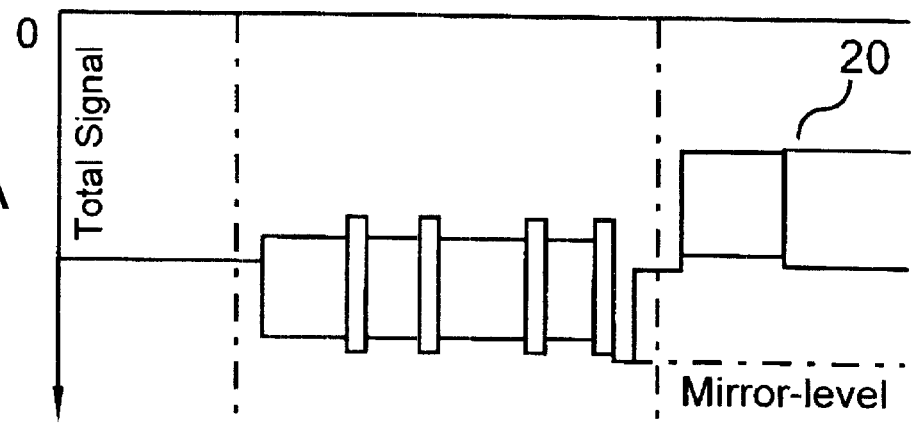
FIGS. 2A and 2B are diagrams showing envelopes of reproduced signal in the first embodiment of the present invention.
Figure 2B:
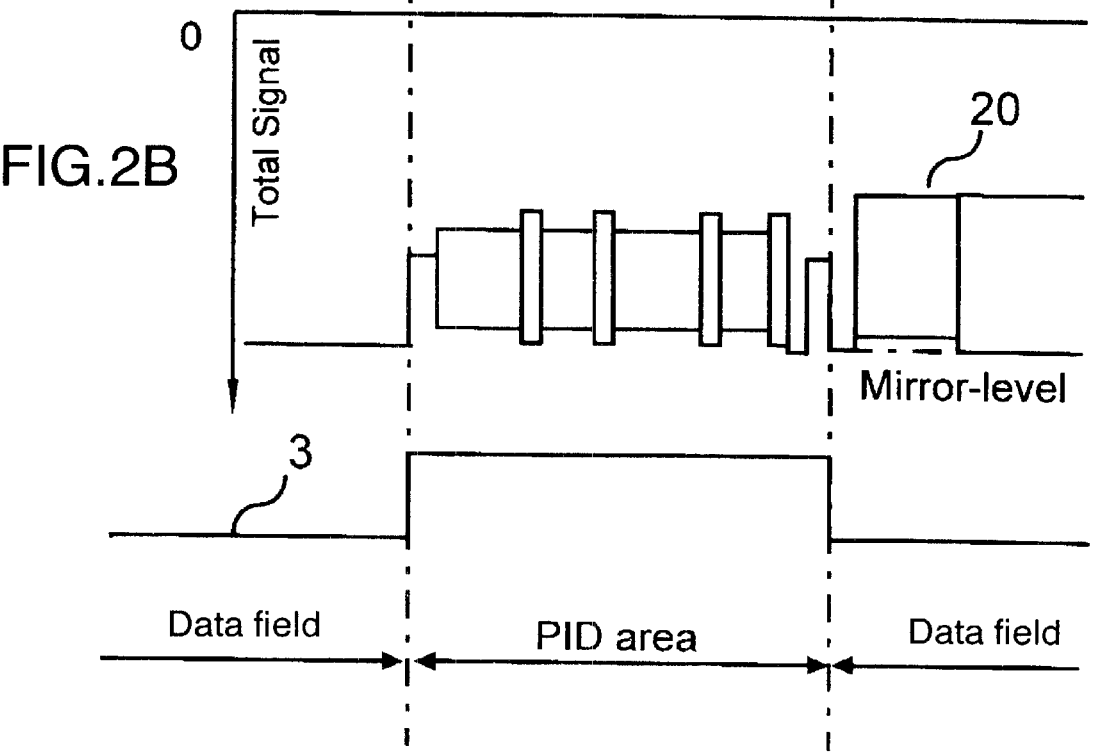
Figure 3:
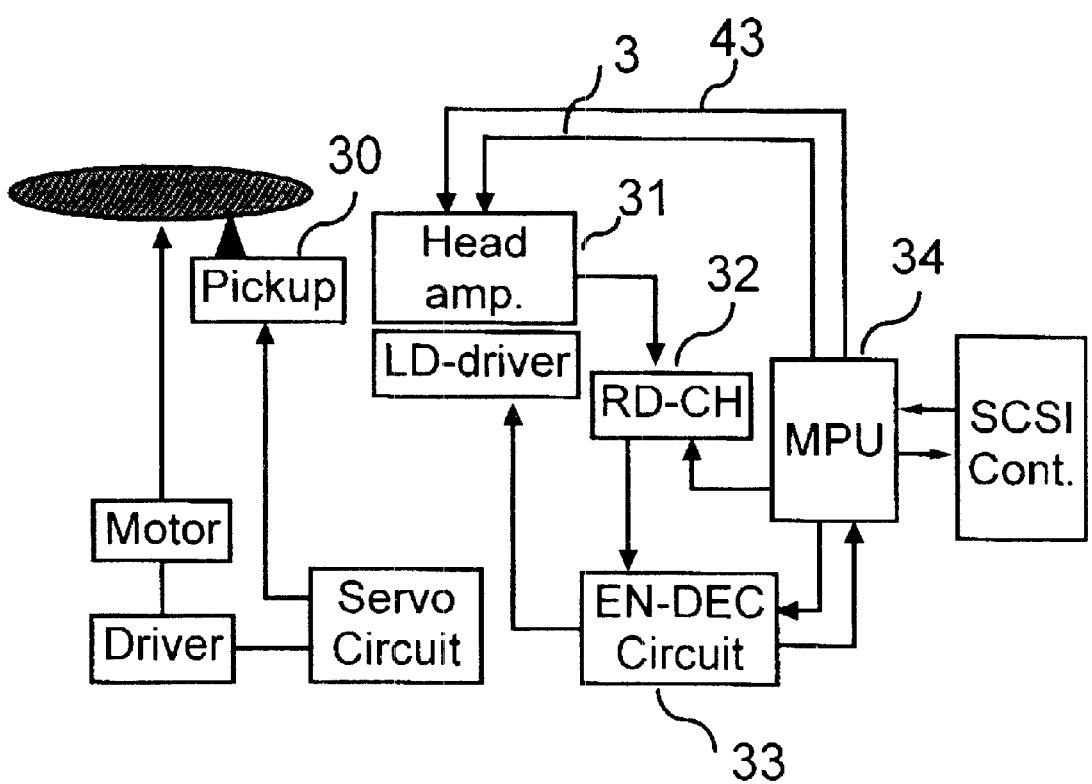
FIG. 3 is an entire block diagram of an optical disk device using the present invention.

First of all, a first embodiment of the present invention will now be described by referring to FIGS. 1 to 3.

Figure 1:
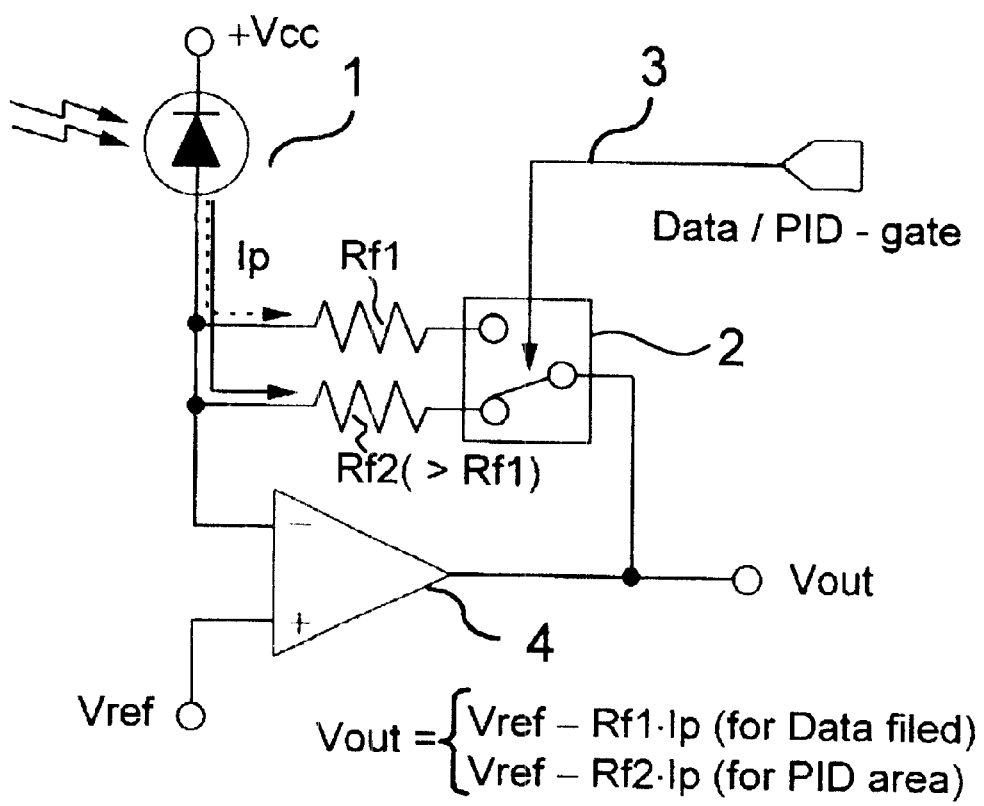
FIG. 1 is a schematic diagram showing the configuration of a current-voltage conversion amplifier according to a first embodiment of the present invention.

FIG. 1 shows the configuration of a current-voltage conversion amplifier including a photodetector. FIGS. 2A and 2B show the operation of the current-voltage conversion by referring to envelopes. FIG. 3 shows an optical disk device using the present invention in the form of an entire block diagram.

In the configuration of the first embodiment, a converted current Ip flowing out from an anode of a photodiode 1 flows through either a gain resistor Rf1 or a gain resistor Rf2. This operation is carried out by a switch circuit 2. As the switch circuit 2, a high speed analog switch device of, for example, CMOS type can be used. Timing for switching the gain resistor is supplied by a data/PID gate signal 3.

By referring to FIG. 3, a generation method of the gate signal 3 will now be described. A reproduced signal supplied from a head amplifier 31 disposed in an optical pickup 30 is passed through a read channel circuit 32, and converted to digital information data. This digital information data is decoded by an encoding and decoding circuit 33. Each address information is read. If address information can be recognized without an error, then an MPU 34 coupled to a SCSI serving as a high rank device counts a predetermined number of a fixed clock pulses by taking the mirror section located at the tail end of the PID area as a timing reference, and then switches a logic level from "low" over to "high." Subsequently, the MPU 34 counts as many clock pulses as corresponding to the length of the data field. Thereupon, the MPU 34 switches the logic level from "high" over to "low." The data/PID gate signal 3 is thus generated. As shown in FIG. 2B, therefore, the gate signal 3 in the present embodiment becomes a logic signal which becomes "high" in the PID area and "low" in the data field. Even if the address cannot be recognized, the timing of the PID area is predicted by counting the clock pulses and the gate signal is generated.

Upon moving from the data field to the PID area, the data/PID gate signal changes to "high" in logic level, and the gain resistor Rf2 is selected. A voltage represented as $V_{ref}-R_{f2} \cdot I_p$ is obtained as the output of the operational amplifier 4. Subsequently, upon moving from the PID area to the data field, the data/PID gate signal changes to "low" in logic level, and the gain resistor Rf1 is selected. A voltage represented as $V_{ref}-R_{f1} \cdot I_p$ is obtained as the output of the operational amplifier 4. The ratio between the resistance values of the two gain resistors Rf2 and Rf1 is set so as to be substantially equal to the ratio between the mirror level and the land/groove level. As compared with the case where the gain resistor is set equal to the same value both for the PID area and the data field (FIG. 2A), therefore, the amplitude of the reproduced signal envelope 20 of the data field can be increased to the maximum so long as it does not exceed the mirror level.

Figure 4:
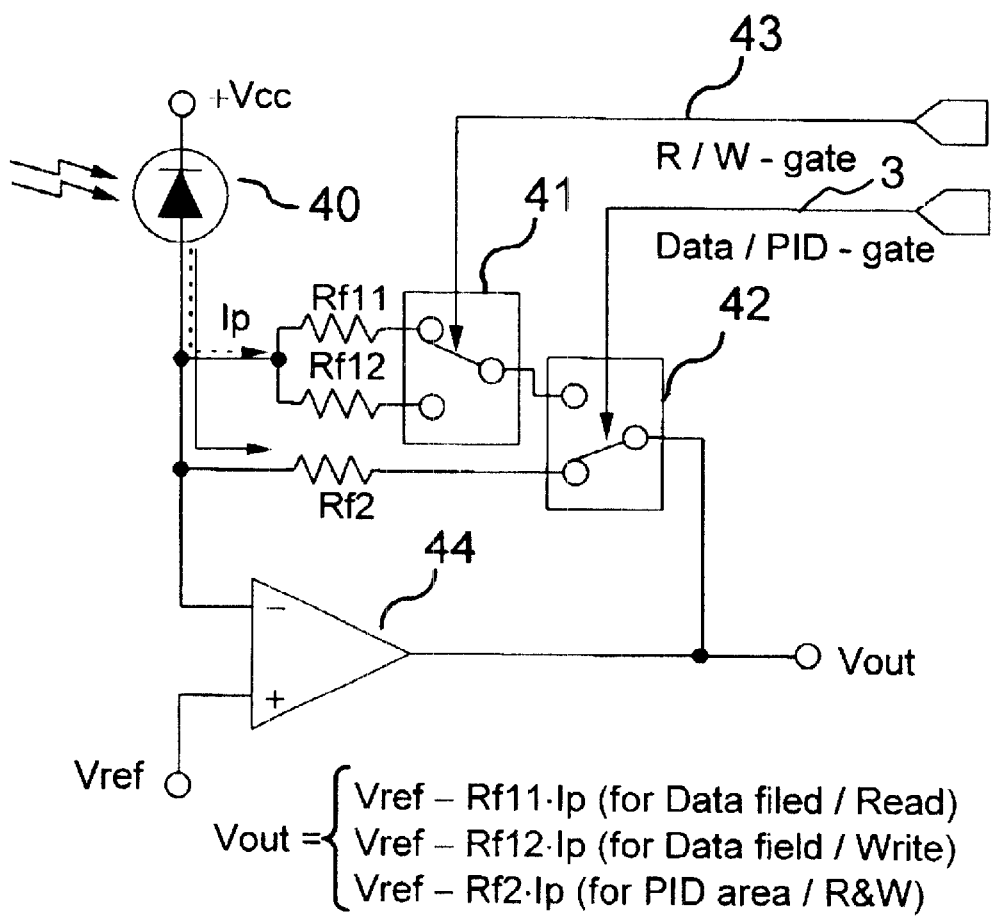
FIG. 4 is a schematic diagram showing the configuration of a current-voltage conversion amplifier according to a second embodiment of the present invention.

FIG. 4 shows a circuit configuration of a head amplifier according to a second embodiment of the present invention. In the first embodiment shown in FIG. 1, switchover of the two gain resistors is performed. In the present embodiment, however, a converted current Ip flowing out from the anode of the photodiode 40 is adapted to flow through one of gain resistors Rf11, Rf12 and Rf2. This switchover operation is carried out by two switch circuits 41 and 42. The timing of switchover of the gain resistor is supplied by a data/PID gate signal 3 for the switch circuit 42, and by a read/write (R/W) gate signal 43 for the switch circuit 41. The gain resistor switchover performed by the switch circuit 41 aims at decreasing the gain so as not to saturate the amplifier circuit for an excessive light quantity during the recording operation. Since the light quantity during the recording operation is larger than that during the reproducing operation, such a countermeasure is required. As a result, it becomes possible to obtain a tracking error signal from the detected signal of the divided photodetectors even during the recording. Hereafter, operation of the present embodiment will be described concretely.

While the PID area is being reproduced, the data/PID gate signal 3 is "high" in logic level irrespective of the R/W gate signal, and consequently the gain resistor Rf2 is selected. A voltage represented as Vref−Rf2·Ip is obtained as the output of the operational amplifier 44. When recording information on the data field, the data/PID gate signal 3 is switched over to "high" in logic level. The switch circuit 42 selects the output of the switch circuit 41. The R/W gate signal 43 becomes "high" in logic level, and the switch circuit 41 selects the gain resistor Rf12. As a result, a voltage represented as Vref−Rf12·Ip is obtained as the output of the operational amplifier 44. As shown in FIG. 3, the R/W gate signal 43 is sent to the head amplifier 31 under an instruction from the MPU 34.

On the other hand, at the time of reproduction of the data field, the switch circuit 41 selects the gain resistor Rf11. As a result, a voltage represented as Vref−Rf11·Ip is obtained as the output of the operational amplifier 44.

The gain resistor Rf12 is set equal to, for example, one fifth, in resistance value, of the gain resistance Rf11. This is based upon assumption that the quantity of light incident on the disk surface is 1 mW at the time of data reproducing whereas the quantity of light incident on the disk surface is 5 mW in average at the time of data recording. Furthermore, in the same way as the case of the first embodiment, the ratio between the two gain resistors Rf2 and Rf11 is set substantially equal to the ratio between the mirror level and the land/group level.

A third embodiment of the present invention will now be described by referring to FIGS. 5A, 5B, 5C, 6A and 6B.

FIG. 5A shows an envelope of a reproduced signal outputted from the conventional head amplifier. On the other head, in the present embodiment, the mirror level is raised to the land/groove level by applying an offset voltage 51 to the reproduced signal of the PID area. Furthermore, by increasing the gain by a value corresponding to the ratio between the mirror level and the land/groove level, such a reproduced signal that the signal for the PID area and the signal for the data field are amplified maximumly is obtained as shown in FIG. 5C.

The operation shown in FIGS. 5B and 5C will now be described by referring to FIG. 6A. A converted current Ip flowing out from the anode of a photodiode 60 selectively is flowed through one of two gain resistors Rf1 and Rf2 by a switch circuit 61.

An instruction for switching over the gain resistor is supplied by an offset addition signal 62. When the offset addition signal is high in logic level, a gain resistor Rf2 is selected and a voltage represented as Vref'−Rf2·Ip is obtained as an output Vout of an operational amplifier 63. When the offset addition signal is low in logic level, a gain resistor Rf1 is selected and a voltage represented as Vref'−Rf1·Ip is obtained as the output Vout of the operational amplifier 63. A noninverting input (+) of the operational amplifier 63 is supplied with an offset voltage 64. The offset voltage (Vref') 64 is a signal higher in the PID area than the reference voltage Vref by the potential difference between the mirror level and the land/groove level.

Figure 6A:
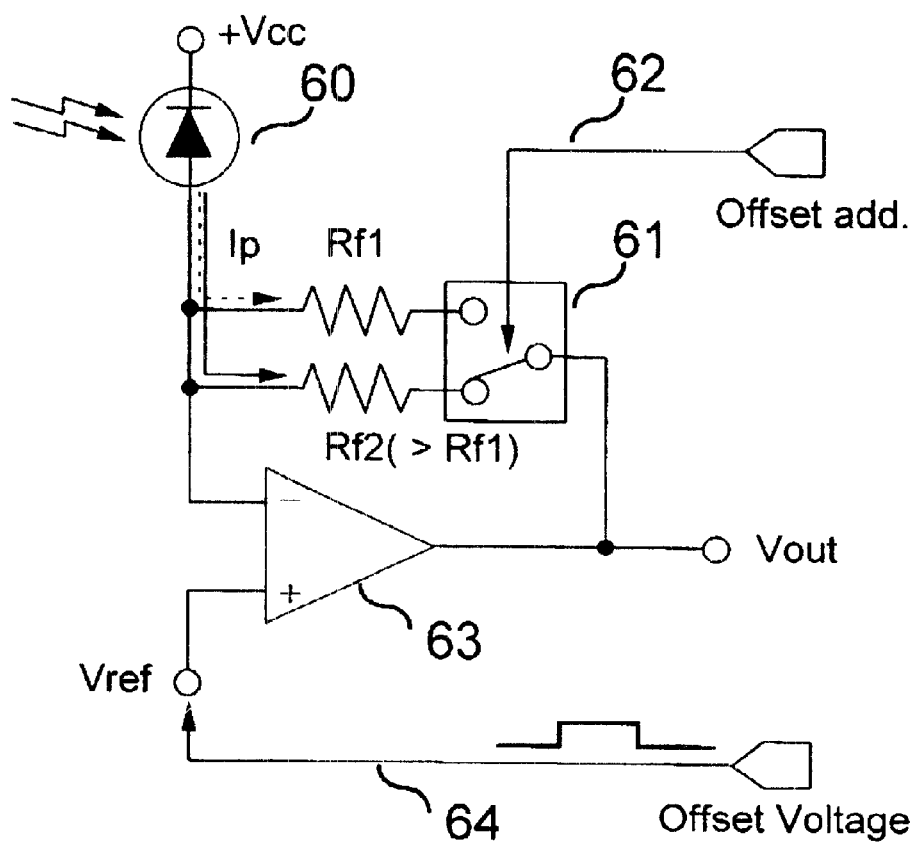
FIG. 6A is a schematic diagram showing the configuration of a current-voltage conversion amplifier according to the third embodiment of the present invention.
Figure 6B:
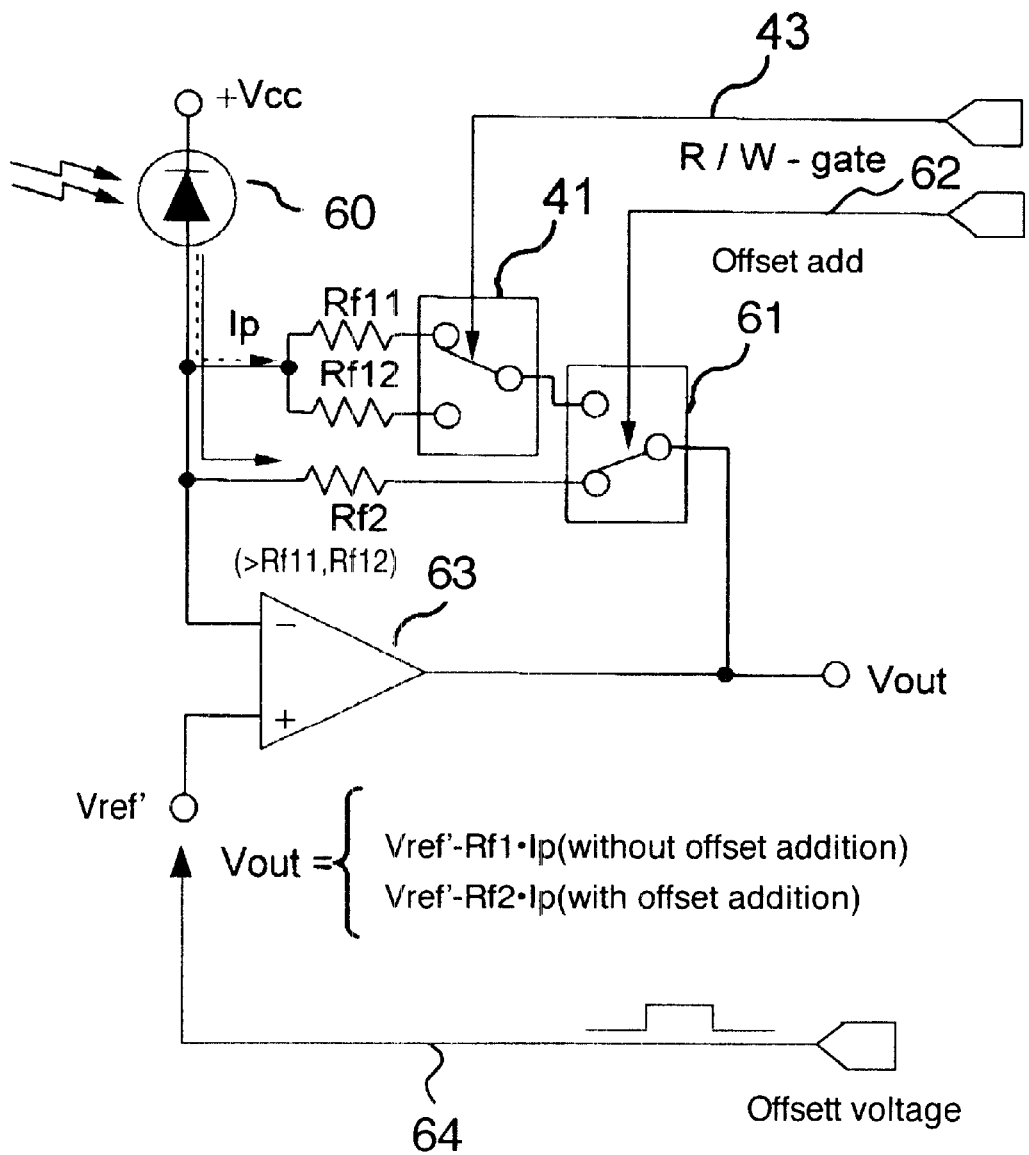
FIG. 6B is a schematic diagram showing the configuration of a variation of the third embodiment of the present invention.

FIG. 6B shows a variation obtained by combining the embodiment shown in FIG. 4 with the embodiment shown in FIG. 6A. In this variation, in addition to the offset operation of FIG. 6A, a circuit for preventing the amplifier from being saturated at the time of recording operation is added. To be concrete, in the same way as FIG. 4, a switch 41 and gate resistors Rf1 and Rf2 are provided so as to be able to change the gain of the head amplifier with an R/W gate signal 43 depending on whether recording is performed or reproducing is performed, and an additional circuit is adapted to perform switchover according to the operation mode. As for the offset voltage 64, the voltage difference between the mirror level and the land/groove level may be added as a reference voltage Vref. Or the mirror level and the land/groove level may be detected for each disk and applied. The latter method will now be described concretely by referring to FIG. 7.

Figure 7:
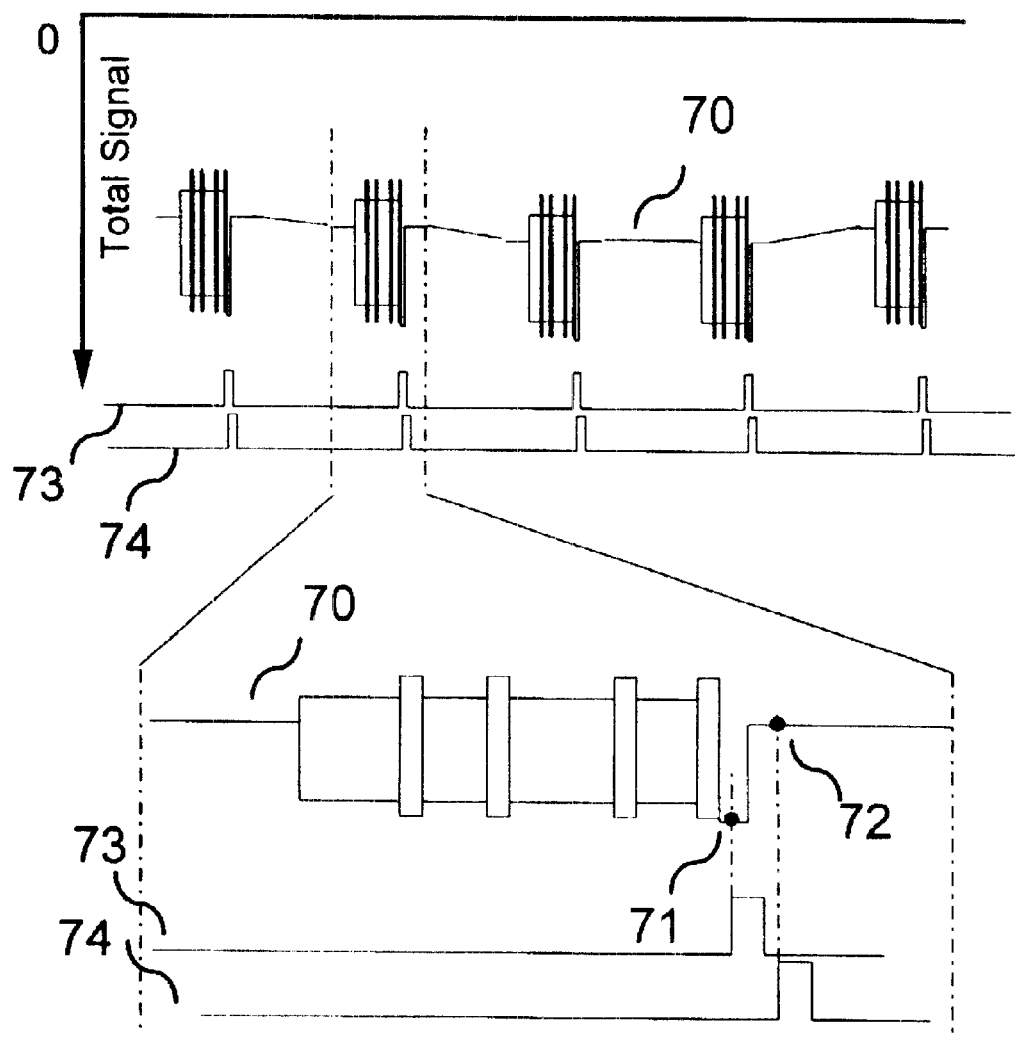
FIG. 7 is a schematic diagram showing a detection method of a mirror level and a land/groove level.
Figure 8A:
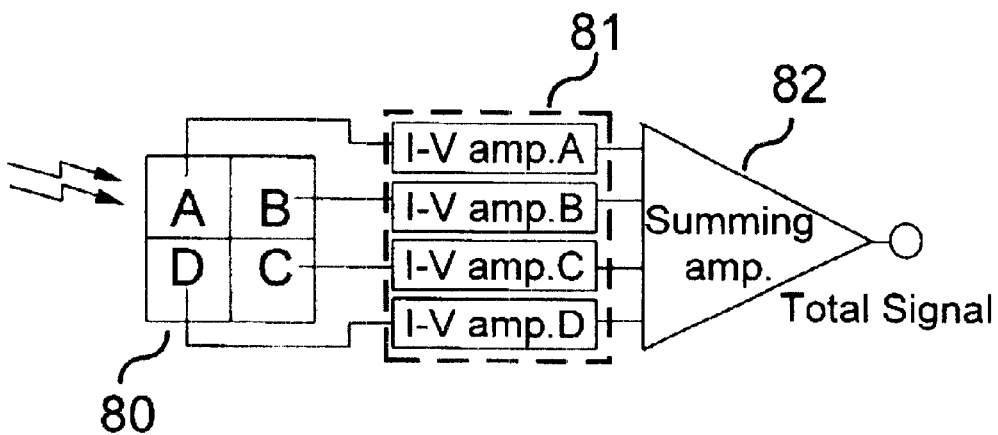
FIGS. 8A and 8B are schematic diagrams showing the configuration of a conventional head amplifier.
Figure 8B:
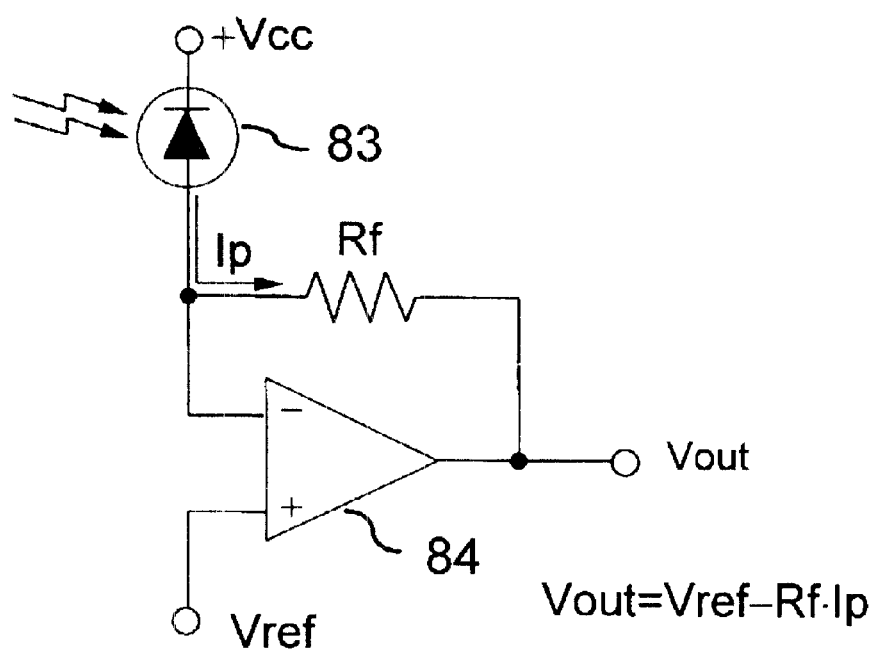
Figure 9:
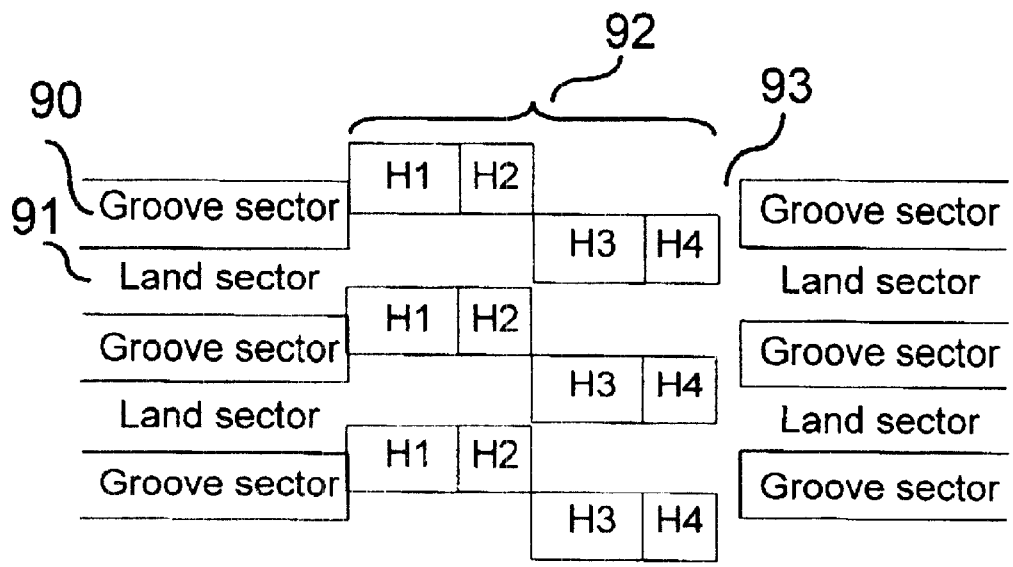
FIG. 9 is a schematic diagram showing the disk format of a DVD-RAM disk used in the present invention.
Figure 10:
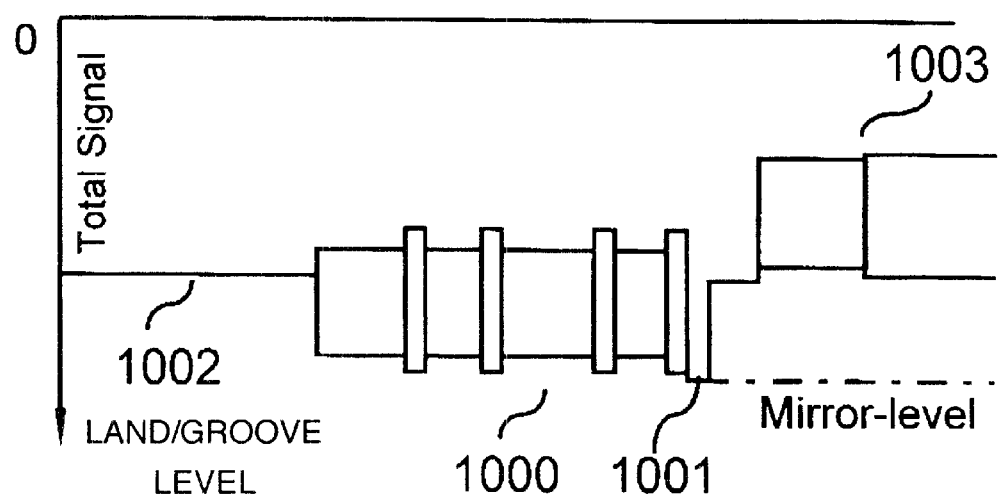
FIG. 10 is a schematic diagram showing a reproduced signal of the DVD-RAM disk.

FIG. 7 shows a signal 70 reproduced by the conventional head amplifier having a fixed gain. In other words, a head amplifier output signal 70 obtained before the offset voltage is applied and the gain resistor is switched over is shown in FIG. 7. A mirror level 71 and a land/groove level 72 are detected by using timing signals 73 and 74, respectively. The sampling timing 73 and 74 can be easily obtained from the data/PID gate signal 3 which is in turn generated at the timing of the PID area by the MPU 34 shown in FIG. 3. For sampling, an A/D conversion device which is not illustrated is used. In the present embodiment, sampling is performed with a sector period. Therefore, high speed operation is not required of the A/D conversion device, and the sampling can be sufficiently carried out by using a current technique. Considering influences of a variation of the reflection factor, error due to noise, quantization errors of the A/D conversion device, and so on caused during one revolution of the disk, it is desirable to average the result of signal levels sampled during at least one revolution of the disk. This averaging processing is carried out by the MPU 34. An average voltage difference between the mirror level and the land/groove level is used as a digital value. On the basis of this result, the offset voltage 64 is generated as an analog voltage by a D/A converter.

According to the present invention, optimum setting of the gain of an amplifier becomes possible by making efficient use of the dynamic range of the amplifier at its maximum without newly developing an amplifier having a wide dynamic range. Furthermore, as the capacity of the DVD-RAM disk is increased, the signal amplitude is significantly lowered in both the PID area and the data field as compared with the mirror level. Even in this situation, the signal quality in the head amplifier can be assured to the maximum.

What is claimed is:

1. An optical disk device for recording a signal onto or reproducing a signal from a disk having a track of land/groove structure, a pre-formatted area, and a mirror area, said optical disk including a head amplifier, said head amplifier comprising:

a photodiode for performing light-current conversion and producing a detected current;

a current-voltage conversion amplifier for converting the detected current into a voltage;

a means for setting a plurality of gain values; and a circuit for switching a gain for a track field of said disk over to a gain for a pre-formatted area and vice versa and performing amplification, said circuit being included in said head amplifier;

wherein when a detected current having a plurality of different direct current levels in time series is supplied, said setting means sets different gain values, so as not exceed a dynamic range of said current-voltage conversion amplifier, for intervals respectively having said different direct current levels, respectively.

2. An optical disk device for recording a signal onto or reproducing a signal from a disk having a track of land/groove structure, a pre-formatted area, and a mirror area, said optical disk including a head amplifier, said head amplifier comprising:

a photodiode for performing light-current conversion and producing a detected current;

a current-voltage conversion amplifier for converting the detected current into a voltage;

again setting circuit for setting a plurality of gain values;

a circuit for applying a plurality of offset voltages;

a circuit for detecting a direct current level of a track and a direct current level of a mirror level on said disk; and a circuit for supplying an offset voltage obtained from a result detected by said detecting circuit, to said current-voltage conversion amplifier by using said offset voltage applying circuit;

wherein when a detected current having a plurality of different direct current levels in time series is supplied, an offset voltage and a gain is set, so as not exceed a dynamic range of said current-voltage conversion amplifier, for each of intervals respectively having said different direct current levels.

3. An optical disk device comprising:

a head amplifier for converting reflected light supplied from an optical recording medium having a pre-formatted area and a recording field into a voltage; and again switchover circuit for switching over a gain of said head amplifier;

wherein said gain switchover circuit switches a gain for the reflected light from said recording field over to a gain for the reflected light from said pre-formatted area, and vice versa.

* * * * *